(12) United States Patent
Nakatsu

(10) Patent No.: US 7,681,688 B2
(45) Date of Patent: Mar. 23, 2010

(54) STEERING APPARATUS

(75) Inventor: Masatoshi Nakatsu, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 313 days.

(21) Appl. No.: 11/684,153

(22) Filed: Mar. 9, 2007

(65) Prior Publication Data

US 2007/0228715 A1    Oct. 4, 2007

(30) Foreign Application Priority Data

Mar. 31, 2006    (JP) ............................... 2006-099907

(51) Int. Cl.
*B62D 5/04* (2006.01)
(52) U.S. Cl. .................... 180/444; 74/388 PS
(58) Field of Classification Search ................ 180/443, 180/444, 446; 74/388 PS
See application file for complete search history.

(56) References Cited

U.S. PATENT DOCUMENTS

| | | | |
|---|---|---|---|
| 4,940,105 A | * | 7/1990 | Matsunaga et al. .......... 180/404 |
| 6,164,150 A | * | 12/2000 | Shindo et al. ............ 74/388 PS |
| 6,834,742 B2 | | 12/2004 | Nakatsu et al. |
| 6,840,347 B2 | | 1/2005 | Nakatsu et al. |

FOREIGN PATENT DOCUMENTS

| | | |
|---|---|---|
| CN | 1485235 A | 3/2004 |
| CN | 1485236 A | 3/2004 |
| JP | 2004-58894 | 2/2004 |
| JP | 2004-123083 | 4/2004 |
| JP | 2004-232567 | 8/2004 |

\* cited by examiner

*Primary Examiner*—Kevin Hurley
(74) *Attorney, Agent, or Firm*—Oblon, Spivak, McClelland, Maier & Neustadt, L.L.P.

(57) ABSTRACT

In a steering apparatus, a differential lock mechanism has a lock holder in which a plurality of groove portions are formed on an outer periphery thereof, and selectively allows and prohibits to generate a difference of steering amount in the rotational direction between an input shaft and an output shaft by selectively engaging and disengaging an engaging portion with respect to the groove portions. A rotation sensor detects the position in the rotational direction of the lock holder during one rotation of the lock holder and repeatedly detects the same sensor pattern being output a plurality of times. A variable transfer ratio unit ECU detects which groove portion, from among the plurality of groove portions, the engaging portion is engaged with using the sensor pattern output by the rotation sensor when a side portion of one of the groove portions is pressing against a side portion of the engaging portion.

6 Claims, 9 Drawing Sheets

II-II

III–III

| SENSOR PATTERN | 1 | 2 | 3 | 4 | 5 | 6 | 1 | 2 | ... |
|---|---|---|---|---|---|---|---|---|---|
| FIRST MAGNETIC SENSOR 72a OUTPUT | H | L | L | L | H | H | H | L | ... |
| SECOND MAGNETIC SENSOR 72b OUTPUT | H | H | L | L | L | H | H | H | ... |
| THIRD MAGNETIC SENSOR 72c OUTPUT | H | H | H | L | L | L | H | H | ... |

FIG.10

| N2 | N1 |
|---|---|
| 3 | 2 |
| 4 | 3 |
| 5 | 2, 3, 4 |
| 6 | 5 |
| 7 | 2, 3, 4, 5, 6 |
| 8 | 3, 5, 7 |
| 9 | 2, 4, 5, 7, 8 |
| 10 | 3, 7, 9 |

STEERING APPARATUS

INCORPORATION BY REFERENCE

The disclosure of Japanese Patent Application No. 2006-099907 filed on Mar. 31, 2006, including the specification, drawings and abstract is incorporated herein by reference in its entirety.

BACKGROUND OF THE INVENTION

1. Field of the Invention

The invention relates to a steering apparatus, and more particularly, a steering apparatus in which the steering angle of a wheel can be changed with respect to the steering angle of a steering wheel.

2. Description of the Related Art

In recent years technology has been developed in which a variable transfer ratio unit, which allows the transfer ratio indicative of the steering angle of a wheel to be changed with respect to the steering angle of a steering wheel, is interposed in a steering shaft. This variable transfer ratio unit changes the transfer ratio by generating a difference of the steering amount between an input shaft and an output shaft in rotation direction. When a vehicle is provided with this kind of a variable transfer ratio unit, a differential lock mechanism is provided which selectively allows and prohibits to generate a difference of the steering amount between the output shaft and the input shaft to enable safer steering operation. One known differential lock mechanism includes a lock holder having a plurality of groove portions in the outer periphery thereof, and an engaging member that selectively engages and disengages with respect to the groove portions. It should be noted that the term "engage" in this specification refers to the engaging member entering or being anywhere in one of the groove portions. Likewise, the term "disengage" in this specification refers to the engaging member withdrawing from or no longer being anywhere in one of the groove portions.

In order to achieve suitable steering control in a steering apparatus having this kind of a variable transfer unit, Japanese Patent Application Publication No. JP-A-2004-58894, for example, proposes a vehicle steering apparatus in which the play angle when a lock arm is inserted into a concave portion is set to be less than the rotation angle of a motor when a different detection signal is output. Also, Japanese Patent Application Publication No. JP-A-2004-123083, for example, proposes a vehicle steering apparatus provided with a lock holder which rotates together with a motor and in which a plurality of first concave portions are formed in the circumferential direction on the outer periphery, and a deeper second concave portion is formed at one end portion of each of the first concave portions.

In order to appropriately change the steering angle of the wheels with respect to the steering angle of the steering wheel, it is imperative to know the positional relationship in the rotational direction between the input shaft and the output shaft when the differential lock was released. In Japanese Patent Application Publication No. JP-A-2004-58894 described above, however, there is no mention of technology for detecting which groove portion of the lock holder the lock arm is engaged with when the ignition switch is turned on, for example. In Japanese Patent Application Publication No. JP-A-2004-58894, a detection signal that is the same as the detection signal indicating that the lock arm is engaged with another groove portion, not the groove portion that the lock arm is actually engaged with, can be output from a rotation sensor. Unless it is known which groove portion of the lock holder the lock arm is engaged with, it is difficult to know the positional relationship in the rotational direction between the input shaft and the output shaft. Also, Japanese Patent Application Publication No. JP-A-2004-123083 does describe technology for detecting the groove portion that the lock arm is engaged with by detecting the width of the groove portion. However, this requires that the widths of the groove portions formed in the lock holder all be different, and the operation for that detection is also complicated.

SUMMARY OF THE INVENTION

This invention thus provides a steering apparatus that can appropriately change the steering angle of a wheel with respect to the steering angle of a steering wheel.

A first aspect of the invention relates to a steering apparatus that has a difference generating mechanism that generates a difference of a steering amount in rotation direction between an input shaft connected to a steering wheel and an output shaft connected to a steering unit that steers a wheel, and a lock holder in which a plurality of groove portions are formed in an outer periphery thereof. This steering apparatus is also provided with a differential lock mechanism that selectively allowing and prohibiting to generate the difference of the steering amount between the input shaft and the output shaft in the rotation direction by selectively engaging and disengaging an engaging member with respect to the groove portions; a rotation sensor that outputs a detection signal indicative of a position in the rotational direction of the lock holder; and a lock position detecting portion that detects which groove portion, from among the plurality of groove portions, the engaging member is engaged with using the detection signal output from the rotation sensor when a side portion of one of the groove portions is pressing against a side portion of the engaging member. According to this aspect, it is possible to detect which groove portion, from among the plurality of groove portions, the engaging member is engaged with according to simple control in which the side portion of a groove portion of the lock holder is pressed against the side portion of the engaging member.

The plurality of groove portions may also be formed such that the detection signal output by the rotation sensor when the side portion of one groove portion is pressing against the side portion of the engaging member is different from the detection signal output by the rotation sensor when the side portion of another groove portion is pressing against the side portion of the engaging member. According to this structure, it is possible to detect which groove portion, from among the plurality of groove portions, the engaging member is engaged with according to a simple structure in which the side portions of the plurality of groove portions are formed in positions such that different detection signals are output.

The plurality of groove portions may have substantially the same length in the circumferential direction and be formed in the outer periphery of the lock holder at equidistant intervals. The rotation sensor may essentially output substantially the same detection signal a plurality of times during one rotation of the lock holder. Also, when the number of the groove portions formed in the lock holder is designated $N1$ and the number of times the rotation sensor outputs substantially the same detection signal during one rotation of the lock holder is designated $N2$, $N1$ and $N2$ may be set such that $N1$ is a smaller value than $N2$ and is neither a prime factor of $N2$ nor a multiple of a prime factor of $N2$. According to this structure, the rotation sensor outputs a different detection signal when a side portion of one groove portion is pressing against a side portion of the engaging member than when a side portion of another groove portion is pressing against the side portion of the engaging member. As a result, it is possible to easily detect which groove portion the engaging member is engaged with.

The rotation sensor may also output a different detection signal depending on the rotational position of the lock holder within a rotatable range of the lock holder while the engaging member is engaged with one of the groove portions from among the plurality of groove portions. According to this structure, it is possible to inhibit the same detection signal from being output when the engagement positions in the rotational direction of the lock holder are different while the engaging member is engaged with a groove portion. Therefore, it is possible to easily ascertain the relative positions in the rotational direction between the input shaft and the output shaft even if generating a difference of the steering amount is prohibited by the differential lock mechanism while the ignition switch is on, for example.

Another aspect of the invention relates to a steering apparatus that includes a difference generating mechanism that generates a difference of a steering amount in a rotational direction between an input shaft connected to a steering wheel and an output shaft connected to a steering unit that steers a wheel; a differential lock mechanism which has a lock holder in which a plurality of shallow groove portions are formed recessed from an outer periphery thereof and a plurality of deep groove portions are formed recessed from the outer periphery thereof, the deep groove portions being deeper than the shallow groove portions, a respective one of the deep groove portions being formed adjacent to a respective one of the shallow groove portions, each of the deep groove portions being on the same side in the circumferential direction of each of the shallow groove portions, the differential lock mechanism selectively allowing and prohibiting to generate the of the steering amount between the input shaft and the output shaft in the rotational direction by selectively engaging and disengaging an engaging member with respect to the shallow groove portions or the deep groove portions; a rotation sensor that outputs a detection signal indicative of a position in the rotational direction of the lock holder; and a lock position detecting portion that detects which deep groove portion, from among the plurality of deep groove portions, the engaging member is engaged with using the detection signal output from the rotation sensor when the engaging member is engaged with one of the deep groove portions.

It is possible to detect which deep groove portion, from among the plurality of deep groove portions, the engaging member is engaged with by making the width in the circumferential direction of each deep groove portion among the plurality of deep groove portions different and detecting the rotation angle of the lock holder while the engaging member is engaged with one of the deep groove portions. However, when detecting the lock position in this way, it is necessary to detect the width of the deep groove portion by first pressing one side surface of the deep groove portion against one side surface of the engaging member and then pressing the other side surface of the deep groove portion against the other side surface of the engaging member. When operating the lock holder in this manner, this operation can be transmitted to the steering wheel and may thus affect the feeling by the user operating the steering wheel. This aspect of the invention, on the other hand, makes it possible to detect which deep groove portion the engaging member is engaged with simply by engaging the engaging member with one of the deep groove portions. As a result, the lock position can be detected while reducing the affect on the feeling by the user.

In this aspect, the plurality of deep groove portions may be formed such that the detection signal output by the rotation sensor when the engaging member is engaged with one deep groove portion is different from the detection signal output by the rotation sensor when the engaging member is engaged with another deep groove portion. According to this structure, it is possible to clearly detect which deep groove portion the engaging member is engaged with using the detection signal.

The plurality of deep groove portions may have substantially the same length in the circumferential direction and be formed in the outer periphery of the lock holder at equidistant intervals. Further, the rotation sensor may essentially output substantially the same detection signal a plurality of times during one rotation of the lock holder. Also, when the number of the deep groove portions formed in the lock holder is designated N1 and the number of times the rotation sensor outputs substantially the same detection signal during one rotation of the lock holder is designated N2, N1 and N2 may be set such that N1 is a smaller value than N2 and is neither a prime factor of N2 nor a multiple of a prime factor of N2. According to this structure, the rotation sensor outputs a different detection signal when the engaging member is engaged with one deep groove portion than it does when the engaging member is engaged with another deep groove portion. As a result, it is possible to easily detect which deep groove portion the engaging member is engaged with.

The rotation sensor may output a different detection signal depending on the rotational position of the lock holder within a rotatable range of the lock holder while the engaging member is engaged with one of the shallow groove portions from among the plurality of shallow groove portions. According to this structure, it is possible to inhibit the same detection signal from being output when the engagement positions in the rotational direction of the lock holder are different while the engaging member is engaged with a shallow groove portion. Therefore, it is possible to easily ascertain the relative positions in the rotational direction between the input shaft and the output shaft when generating a difference of the steering amount is prohibited by the differential lock mechanism while the ignition switch is on, for example.

According to the steering apparatus of the invention, the steering angle of a wheel can be appropriately changed with respect to the steering angle of a steering wheel.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 10 is a view illustrating the relationship between N1 and N2 to easily determine which groove portion the engaging portion is engaged with when the number of groove portions in the lock holder is designated N1 and the number of times the rotation sensor outputs the same signal during one rotation of the lock holder is designated N2.

DETAILED DESCRIPTION OF THE PREFERRED EMBODIMENTS

In the following description and the accompanying drawings, the present invention will be described in more detail in terms of exemplary embodiments.

First Example Embodiment

Figure 1:
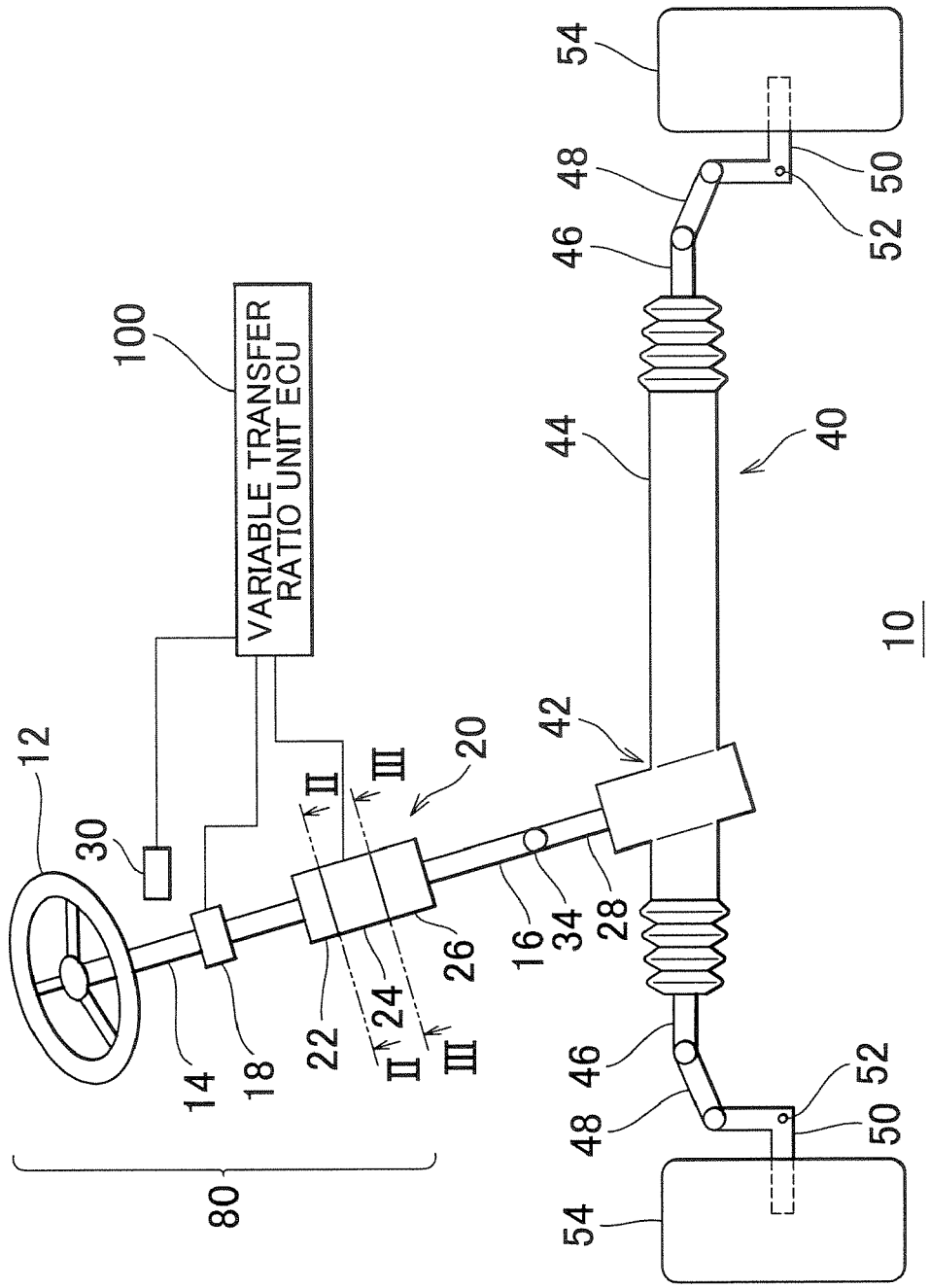
FIG. 1 is an overall block diagram of a steering system according to a first example embodiment of the invention.

FIG. 1 is an overall block diagram of a steering system 10 according to a first example embodiment of the invention. The drawing shows the steering system 10 as viewed from above looking down with respect to the vehicle. The steering system 10 includes a steering apparatus 80 and a steering unit 40.

The steering apparatus 80 includes a steering wheel 12, a steering shaft, an ignition sensor 30, a steering angle sensor 18, and a variable transfer ratio unit 20. The steering shaft is formed of an input shaft 14 and an output shaft 16 arranged on the same axis.

The steering wheel 12 is provided in a vehicle cabin and rotatably operated by a driver. The input shaft 14 is linked to the steering wheel 12 at one end so that it rotates together with the steering wheel 12.

The steering angle sensor 18 is provided on the input shaft 14 and detects the steering angle and the steering direction of the steering wheel 12. The steering angle sensor 18 is connected to a variable transfer ratio unit ECU (ECU: Electronic Control Unit) 100. The steering angle sensor 18 outputs detection results (i.e., signals indicative thereof) to the variable transfer ratio unit ECU 100.

The ignition sensor 30 detects on and off operations of an ignition switch by the user. The ignition sensor 30 is also connected to the variable transfer ratio unit ECU 100 and outputs detection results (i.e., signals indicative thereof) to the variable transfer ratio unit ECU 100.

The variable transfer ratio unit 20 includes a difference generating mechanism 26, a motor 24, and a differential lock mechanism 22. The variable transfer ratio unit 20 is connected at one end to the input shaft 14 and at the other end to the output shaft 16. The difference generating mechanism 26 includes a wave generator, a flexspline, a driven gear, and a stator gear, none of which are shown.

The wave generator is formed of a plug and a flexible bearing, neither of which are shown. The outer periphery of the plug is formed in an elliptical plate shape. The center of this elliptical plug is fixed to a rotating shaft of the motor 24 which drives the plug. The wave bearing is provided on the outer periphery of the plug. The driven gear and the stator gear are formed as internal teeth with teeth having the same pitch circle but differing in number. The stator gear is connected to the input shaft 14 so that it rotates with the input shaft 14. The driven gear is connected to the output shaft 16 so that it rotates with the output shaft 16. The driven gear and the stator gear are provided adjacent to one another on the same axis.

The flexspline is formed of flexible material in a cylindrical shape and has a gear portion with external teeth on its outer periphery. The flexspline is arranged inside the driven gear and the stator gear. The wave generator is arranged inside the cylindrical flexspline. Having the wave generator arranged in the flexspline causes a portion of the flexspline to bend and mesh with a portion of the stator gear and the driven gear. When the wave generator is driven by the motor 24 in this state, the position where the gear of the flexspline meshes with the stator gear and the driven gear moves in the circumferential direction. Because the stator gear and the driven gear have a different number of teeth, as described above, a difference of the steering amount is generated between the input shaft 14 and the output shaft 16 in the rotational direction. In this way, the variable transfer ratio unit 20 changes the transfer ratio indicative of the steering angle of front wheels 54 with respect to the steering angle of the steering wheel 12.

The other end of the output shaft 16 is connected to one end of a connecting shaft 28 via a universal joint 34. A pinion gear, not shown, is provided on the other end of the connecting shaft 28.

A steering unit 40 includes a gearbox 44, a steering shaft 46, tie rods 48, and knuckle arms 50. The gearbox 44 is generally cylindrical in shape and is arranged so that its axial direction is parallel to the left-right direction of the vehicle. The steering shaft 46 is inserted through the inside of the gearbox 44 and arranged so that both ends protrude from the gearbox 44. A rack gear is provided on the steering shaft 46. The pinion gear of the connecting shaft 28 and the rack gear of the steering shaft 46 are in mesh with each other inside the gearbox 44, forming a rack-and-pinion mechanism 42. This rack-and-pinion mechanism 42 converts rotational movement of the steering wheel 12 to linear movement in the axial direction of the steering shaft 46.

One end of one tie rod 48 is connected to one end portion of the steering shaft 46 and one end of another tie rod 48 is connected to the other end portion of the steering shaft 46. The other end of each tie rod 48 is connected to a corresponding knuckle arm 50 that supports a corresponding front wheel 54. The knuckle arm 50 is mounted to the vehicle so as to be able to pivot around a kingpin 52. When the steering shaft 46 moves in the axial direction, the knuckle arms 50 pivot via the tie rods 48 such that the front wheels 54 are steered.

The variable transfer ratio unit ECU 100 calculates a target transfer ratio using the detection results from the steering angle sensor 18 and the detection results from a wheel speed sensor, not shown. The variable transfer ratio unit ECU 100 then controls the power supplied to the motor 24 to generate the difference necessary to achieve the target transfer ratio. The variable transfer ratio unit ECU 100 realizes appropriate steering control by controlling the variable transfer ratio unit 20 in this manner.

Figure 2:
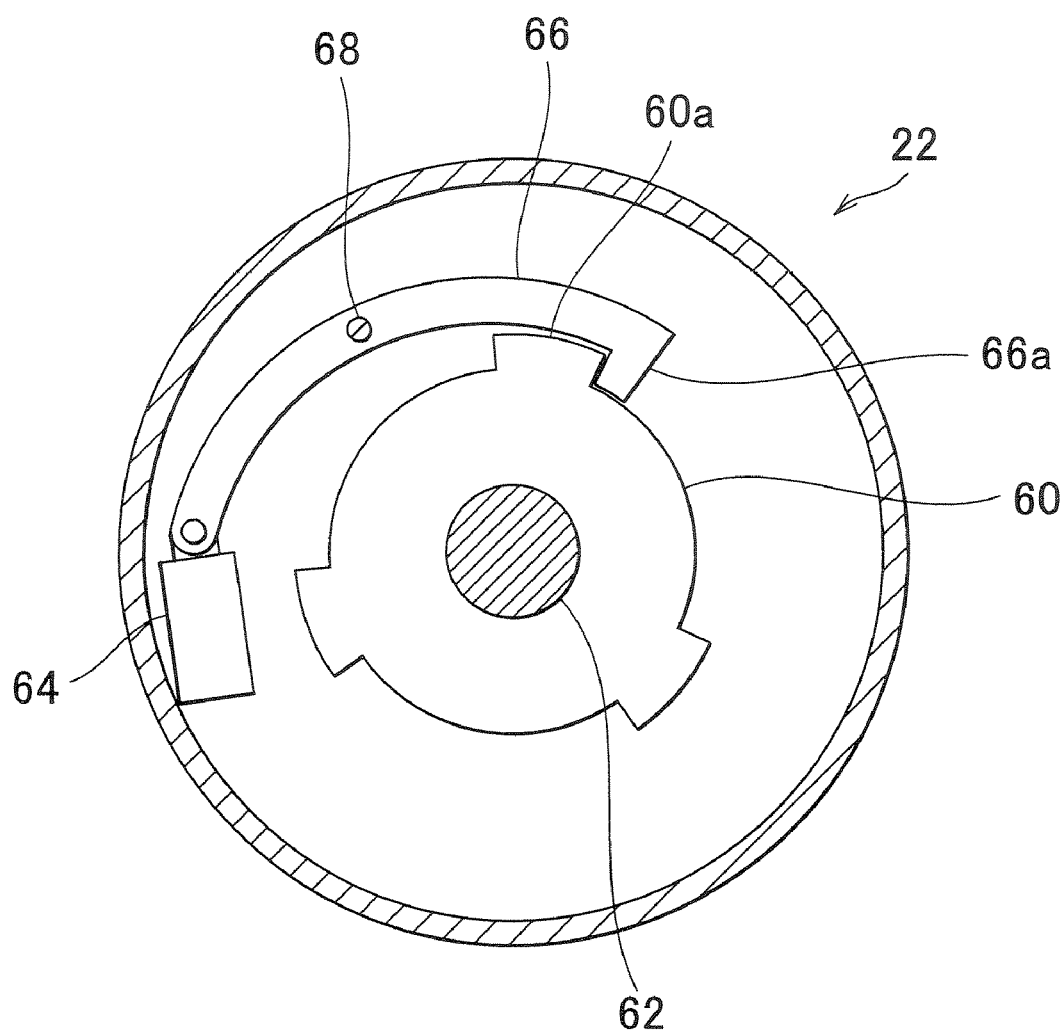
FIG. 2 is a sectional view taken along line II-II in FIG. 1 of the steering system according to the first example embodiment of the invention.

FIG. 2 is a sectional view taken along line II-II in FIG. 1 of the steering system 10 according to the first example embodiment of the invention. The differential lock mechanism 22 includes a solenoid 64, a lock arm 66, and a lock holder 60.

The lock holder 60 has a cylindrical shape and is loosely inserted into and fixed to a motor shaft 62 of the motor 24. The lock holder 60 may also function as a torque limiter that rotates together with the motor shaft 62 while torque of less than a predetermined value is applied, and is able to rotate relative to the motor shaft 62 when torque of the predetermined value or greater is applied. As a result, the size of the lock holder 60 and the lock arm 66 can be kept from increasing considering that a large amount of torque may be applied to the lock holder 60.

A plurality of teeth portions 60a protruding outward in the radial direction are formed on the outer periphery of the lock holder 60, with groove portions being formed inward in the radial direction between these plurality of teeth portions 60a. The lock arm 66 is formed curved in an arc shape and arranged so as to partially encircle the lock holder 60. An engaging portion 66a which protrudes toward substantially the center of the lock holder 60 is formed on one end of the lock arm 66.

The lock arm 66 is pivotally supported at substantially its center by a pivot shaft 68. The pivot shaft 68 is fixed to a housing of the differential lock mechanism 22. The other end of the lock arm 66 is connected to the solenoid 64. The solenoid 64 is connected to the variable transfer ratio unit ECU 100 which controls the operation of the solenoid 64 by controlling the supply of power to the solenoid 64.

When the solenoid 64 is operating, the engaging portion 66a is disengaged from the groove portion of the lock holder 60. At this time, the lock holder 60 is unlocked such that rotation of the motor shaft 62 is not restricted by the engaging portion 66a. The housing of the differential lock mechanism 22 is connected to the input shaft 14 so it rotates together with the input shaft 14. The driven gear of the difference generating mechanism 26 driven by the motor 24 is connected to the output shaft 16. Therefore, when the lock by the differential lock mechanism 22 is released, the variable transfer ratio unit 20 can change the transfer ratio.

When the solenoid 64 stops operating, a solenoid shaft inside the solenoid 64 is returned by urging force of a spring, not shown, so that it protrudes and the lock arm 66 pivots around the pivot shaft 68. As a result, the engaging portion 66a engages with a groove portion of the lock holder 60. When the engaging portion 66a is engaged with a groove portion of the lock holder 60, the rotation angle of the lock holder 60 is restricted to the rotation angle between the width in the circumferential direction of the groove portion minus the width in the circumferential direction of the engaging portion 66a, i.e., by the so-called amount of play. When the lock holder 60 is locked by the differential lock mechanism 22 in this way, the difference of the steering amount generated by the difference generating mechanism 26 is restricted and the transfer ratio by the variable transfer ratio unit 20 is substantially constant. Therefore, the lock arm 66 functions as an engaging member that locks the lock holder 60 against rotation (i.e., prohibits the lock holder 60 from rotating) by engaging with the groove portion of the lock holder 60.

Figures 3, 4:
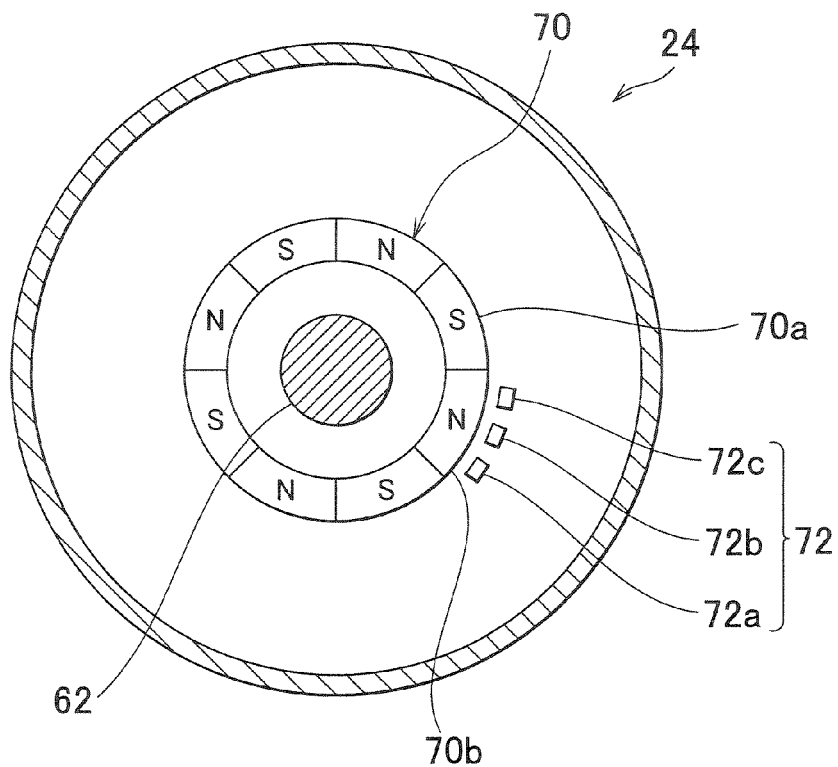
FIG. 3 is a sectional view taken along line III-III in FIG. 1 of the steering system according to the first example embodiment of the invention.
FIG. 4 is a chart showing the relationship between output from first, second, and third magnetic sensors and a sensor pattern output by a rotation sensor.

FIG. 3 is a sectional view taken along line III-III in FIG. 1 of the steering system 10 according to the first example embodiment of the invention. The motor 24 includes a rotor 70 and a stator which is not shown. The stator is formed in a circle by wound coil and is fixed to the housing of the motor 24 so as to surround the rotor 70 with space in between. The rotor 70 is formed in a cylindrical shape and the motor shaft 62 is inserted through and fixed to the rotor 70 so that the rotor 70 rotates with the motor shaft 62. The rotor 70 has permanent magnets provided such that S poles 70a and N poles 70b having substantially the same width in the circumferential direction are lined up alternately in the circumferential direction in four sets.

A rotation sensor 72 is provided close to the outer periphery of the rotor 70. The rotation sensor 72 is fixed to the housing of the motor 24. The rotation sensor 72 includes a first magnetic sensor 72a, a second magnetic sensor 72b, and a third magnetic sensor 72c. The first magnetic sensor 72a, the second magnetic sensor 72b, and the third magnetic sensor 72c are lined up in the circumferential direction, with each sensor being at a 15 degree angle around the rotational center of the motor shaft 62 with respect to the adjacent sensor. The first magnetic sensor 72a, the second magnetic sensor 72b, and the third magnetic sensor 72c each output a high voltage value when near the S pole 70a and output a low voltage value when near the N pole 70b. The rotation sensor 72 may be a resolver or the like which outputs an analog signal.

FIG. 4 is a chart showing the relationship between the outputs from first, second, and third magnetic sensors 72a, 72b, and 72c and a sensor pattern output by the rotation sensor 72. In the drawing, H indicates that the voltage value output is high and L indicates that the voltage value output is low.

When an S pole 70a is opposite the first magnetic sensor 72a, the second magnetic sensor 72b, and the third magnetic sensor 72c in the direction of the rotational center of the motor shaft 62, all of the magnetic sensors 72a to 72c are near the S pole 70a so a high voltage value is output from all three. At this time the rotation sensor 72 outputs sensor pattern "1" as a detection signal.

When the rotor 70 rotates counterclockwise in FIG. 3 and an N pole 70b approaches the first magnetic sensor 72a, the first magnetic sensor 72a outputs a low voltage value and the second and third magnetic sensors 72b and 72c output high voltage values. At this time, the rotation sensor 72 outputs sensor pattern "2" as shown in FIG. 4.

When the rotor 70 rotates farther counterclockwise 15 degrees in FIG. 3, an N pole 70b is near the first magnetic sensor 72a and the second magnetic sensor 72b. At this time, the first magnetic sensor 72a and the second magnetic sensor 72b output low voltage values while the third magnetic sensor 72c outputs a high voltage value. At this time, the rotation sensor 72 outputs sensor pattern "3" as shown in FIG. 4.

In this way, the rotation sensor 72 outputs a different sensor pattern, from among of six patterns, for every 15 degree rotation angle during the rotor 70 rotates 90 degrees. The rotor 70 and the lock holder 60 are fixed to, and thus rotate together with, the motor shaft 62 so the rotation sensor 72 repeatedly outputs the six sensor patterns a plurality of times (four times in the first example embodiment) during one rotation of the lock holder 60.

Figure 5:
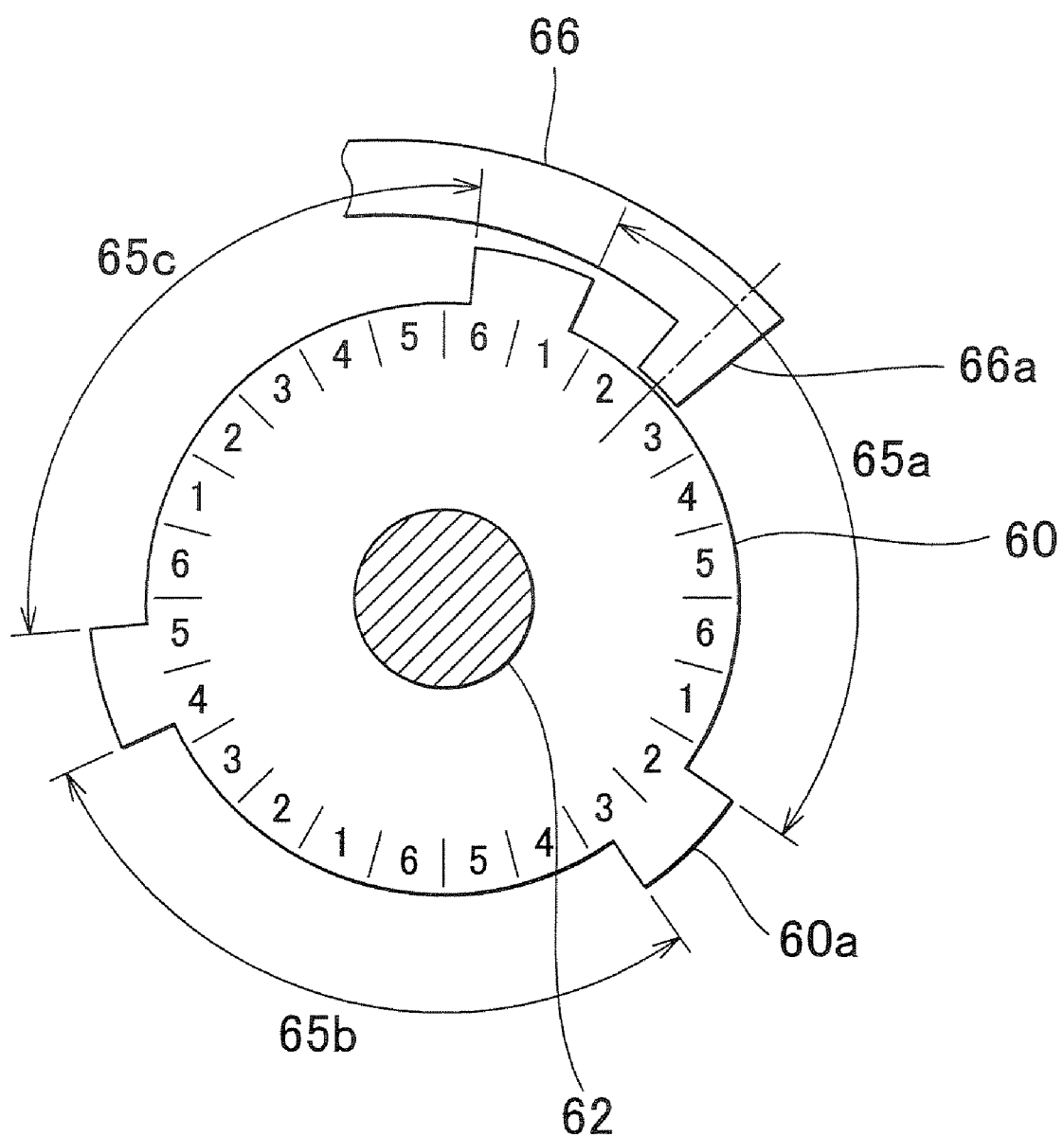
FIG. 5 is a view illustrating the relationship between the position in the rotational direction of a lock holder according to the first example embodiment and the sensor pattern output from the rotation sensor.

FIG. 5 is a view illustrating the relationship between the position in the rotational direction of the lock holder 60 according to the first example embodiment and the sensor pattern output from the rotation sensor 72. The lock holder 60 has three teeth portions 60a on its outer periphery. Accordingly, a first groove portion 65a, a second groove portion 65b, and a third groove portion 65c (hereinafter collectively referred to as "groove portions 65" as necessary) are formed between adjacent teeth portions 60a. In the drawing, the numbers one to six noted on the lock holder 60 are numbers over which the center line in the circumferential direction of the engaging portion 66a is positioned, and refer to the number output by the rotation sensor 72. Therefore, for example, the state shown in FIG. 5 is one in which the rotation sensor 72 outputs sensor pattern "3".

When the engaging portion 66a is engaged with the first groove portion 65a such that the left side portion of the first groove portion 65a contacts the left side portion of the engaging portion 66a, the center line in the circumferential direction of the engaging portion 66a is in the range of number "2" so the rotation sensor 72 outputs sensor pattern "2". As the lock holder 60 rotates counterclockwise from that position, the rotation sensor 72 outputs a different sensor pattern, i.e., 3, 4, 5, 6 in that order, each time the lock holder 60 rotates 15 degrees. When the right side portion of the first groove portion 65a is pressing against the right side portion of the engaging portion 66a, the rotation sensor 72 outputs sensor pattern "1". The left side portion and the right side portion indicate a left-right relationship when the circumferential direction is viewed from the center of the lock holder 60. This is also true in the following description.

When the engaging portion 66a engages with the second groove portion 65b such that the left side portion of the second groove portion 65b contacts the left side portion of the engaging portion 66a, the center line in the circumferential direction of the engaging portion 66a is within the range of number "4" so the rotation sensor 72 outputs sensor pattern "4". As the lock holder 60 rotates counterclockwise from that position, the rotation sensor 72 outputs a different sensor pattern, i.e., 5, 6, 1, 2 in that order, each time the lock holder 60 rotates 15 degrees. When the right side portion of the second groove portion 65b is pressing against the right side portion of the engaging portion 66a, the rotation sensor 72 outputs sensor pattern "3".

When the engaging portion 66a engages with the third groove portion 65c such that the left side portion of the third groove portion 65c contacts the left side portion of the engaging portion 66a, the center line in the circumferential direction of the engaging portion 66a is within the range of number "6" so the rotation sensor 72 outputs sensor pattern "6". As the lock holder 60 rotates counterclockwise from that position, the rotation sensor 72 outputs a different sensor pattern, i.e., 1, 2, 3, 4 in that order, each time the lock holder 60 rotates 15 degrees. When the right side portion of the third groove portion 65c is pressing against the right side portion of the engaging portion 66a, the rotation sensor 72 outputs sensor pattern "5".

In the related art as well, a rotation sensor provided in a variable transfer ratio unit generally detects the rotational position of a rotor of a motor. However, the rotor may have a plurality of sets of S poles and N poles, in which case the same detection signal is output a plurality of times during one rotation of the rotor. For example, sensor pattern "3" is a detection signal that the rotation sensor can output regardless of which of the three groove portions, i.e., the first groove portion, the second groove portion, and the third groove portion, the engaging portion is engaged with. Therefore, the variable transfer ratio unit ECU is unable to distinguish which groove portion the engaging portion is engaged with even if sensor pattern "3" is input from the rotation sensor. As a result, it is not possible to accurately know the position in the rotational direction of the lock holder, and thus not possible to know the relative positions in the rotational direction of the input shaft and the output shaft.

Also, when the ignition switch is off, it is difficult to continue to monitor the position in the rotational direction of the motor shaft with the variable transfer ratio unit ECU. In this case, when the ignition switch is turned on again, the variable transfer ratio unit ECU has difficulty in determining which groove portion the engaging portion is engaged with using only the sensor pattern input from the rotation sensor.

Therefore, in this example embodiment, the groove portions 65 are made the same length in the circumferential direction and formed in the outer periphery of the lock holder 60 at equidistant intervals. Also, as described above, when the rotation sensor 72 repeatedly outputs the same detection signal a plurality of times during one rotation of the lock holder 60, the number of groove portions formed in the lock holder 60 is designated N1 and the number of times the rotation sensor 72 outputs the same detection signal during one rotation of the lock holder 60 is designated N2. N1 and N2 are set to satisfy a condition in which N1 is a smaller value than N2 and is neither a prime factor of N2 nor a multiple of a prime factor of N2. In this example embodiment, N1 equals 3 and N2 equals 4 so this condition is satisfied. Setting N1 and N2 in this way makes the detection signal output by the rotation sensor 72 different for each groove portion when one end portion of each groove portion 65 is pressed against the side portion of the engaging portion 66a.

The variable transfer ratio unit ECU 100 determines whether the ignition switch has been operated by the user using the detection signal input from the ignition switch 30. When the variable transfer ratio unit ECU 100 determines that the ignition switch has been turned off, it stops operation of the solenoid 64, thus engaging the engaging portion 66a with the groove portion 65. Next, the variable transfer ratio unit ECU 100 supplies current to the motor 24 via a drive circuit to operate the motor 24 in order to rotate the lock holder 60 counterclockwise in the drawing, such that the right side portion of the groove portion 65 hits the right side portion of the engaging portion 66a. At this time, the variable transfer ratio unit ECU 100 determines that the side portion of the engaging portion 66a has hit the right side surface of the groove portion 65 when the duty of the current value for driving the motor 24 has become a predetermined value or greater. The variable transfer ratio unit ECU 100 stores the rotation count number of the motor 24 in EEPROM (Electronically Erasable and Programmable Read Only Memory), not shown, which is provided in the variable transfer ratio unit ECU 100.

Thereafter, when it has been determined that the ignition switch has been turned on, the variable transfer ratio unit ECU 100 detects the sensor pattern output from the rotation sensor 72. The variable transfer ratio unit ECU 100 identifies the rotational position of the motor 24 by referencing the detected sensor pattern and the rotation count number stored in the EEPROM.

More specifically, when the sensor pattern is "1", the variable transfer ratio unit ECU 100 determines that the engaging portion 66a is engaged with the first groove portion 65a. When the sensor pattern is "3", the variable transfer ratio unit ECU 100 determines that the engaging portion 66a is engaged with the second groove portion 65b. When the sensor pattern is "5", the variable transfer ratio unit ECU 100 determines that the engaging portion 66a is engaged with the third groove portion 65c.

In this way, the variable transfer ratio unit ECU 100 detects which groove portion, from among the plurality of groove portions, the engaging portion 66a is engaged with using the detection signal from the rotation sensor 72 that is output when the side portion of the groove portion formed in the lock holder 60 is pressing against the side portion of the engaging portion 66a. Therefore, the variable transfer ratio unit ECU 100 functions as a lock position detecting portion that detects which groove portion, from among the plurality of groove portions, the engaging member is engaged. As a result, it is possible to detect which groove portion, from among a plurality of groove portions, the engaging member is engaged with using simple control.

The steering system 10 is adjusted at shipping so that the steering wheel 12 is positioned in a rotational position (i.e., the steering N point) indicative of straight ahead when the vehicle is in a state traveling straight ahead (i.e., vehicle N point). In this way, the rotational position of the motor 24 at the vehicle N point or the steering N point is designated as actuator N point. The detection results from the rotation sensor 72 at this time are stored in advance in the EEPROM. Therefore, the variable transfer ratio unit ECU 100 references the data indicative of the actuator N point stored in the EEPROM and counts the rotations of the motor 24 up and down using that data as a reference.

While the ignition switch is on, the variable transfer ratio unit ECU 100 constantly monitors the rotational position of the motor shaft 62, referencing the sensor pattern input from the rotation sensor 72. Therefore, while the ignition switch is on, the variable transfer ratio unit ECU 100 is able to determine which groove portion the engaging portion 66a is engaged with without a side portion of a groove portion pressing against a side portion of the engaging portion 66a. Also, even if an electrical angle of the motor 24 is skipped during monitoring, the variable transfer ratio unit ECU 100 can still easily identify the rotational position of the motor 24 again as long as a mechanical angle of 360 degrees or more is not skipped. Furthermore, the variable transfer ratio unit ECU 100 can also easily confirm that an electrical angle of the motor 24 has not been skipped.

Here, a side portion of each groove portion 65 is formed in a position such that the rotation sensor 72 outputs a different detection signal depending on the rotation angle of the lock holder 60 within a rotatable range of the lock holder 60 while the engaging portion 66a is engaged. By forming the groove portions 65 in this way, for example, when the engaging portion 66a is engaged with the first groove portion 65a and sensor pattern "3" is output from the rotation sensor 72, there is only one corresponding position in the rotational direction of the motor shaft 62. Therefore, the variable transfer ratio unit ECU 100 is not only able to identify the groove portion 65 that the engaging portion 66a is engaged with, but can also correctly ascertain the relative positions in the rotational direction of the input shaft 14 and the output shaft 16 using the sensor pattern input from the rotation sensor 72.

Once the relative positions in the rotational direction of the input shaft 14 and the output shaft 16 are ascertained, the variable transfer ratio unit ECU 100 performs control to supply power to the solenoid 64 and disengage the engaging portion 66a from the groove portion 65, thus enabling the transfer ratio to be changed by the variable transfer ratio unit 20.

Second Example Embodiment

Figure 6:
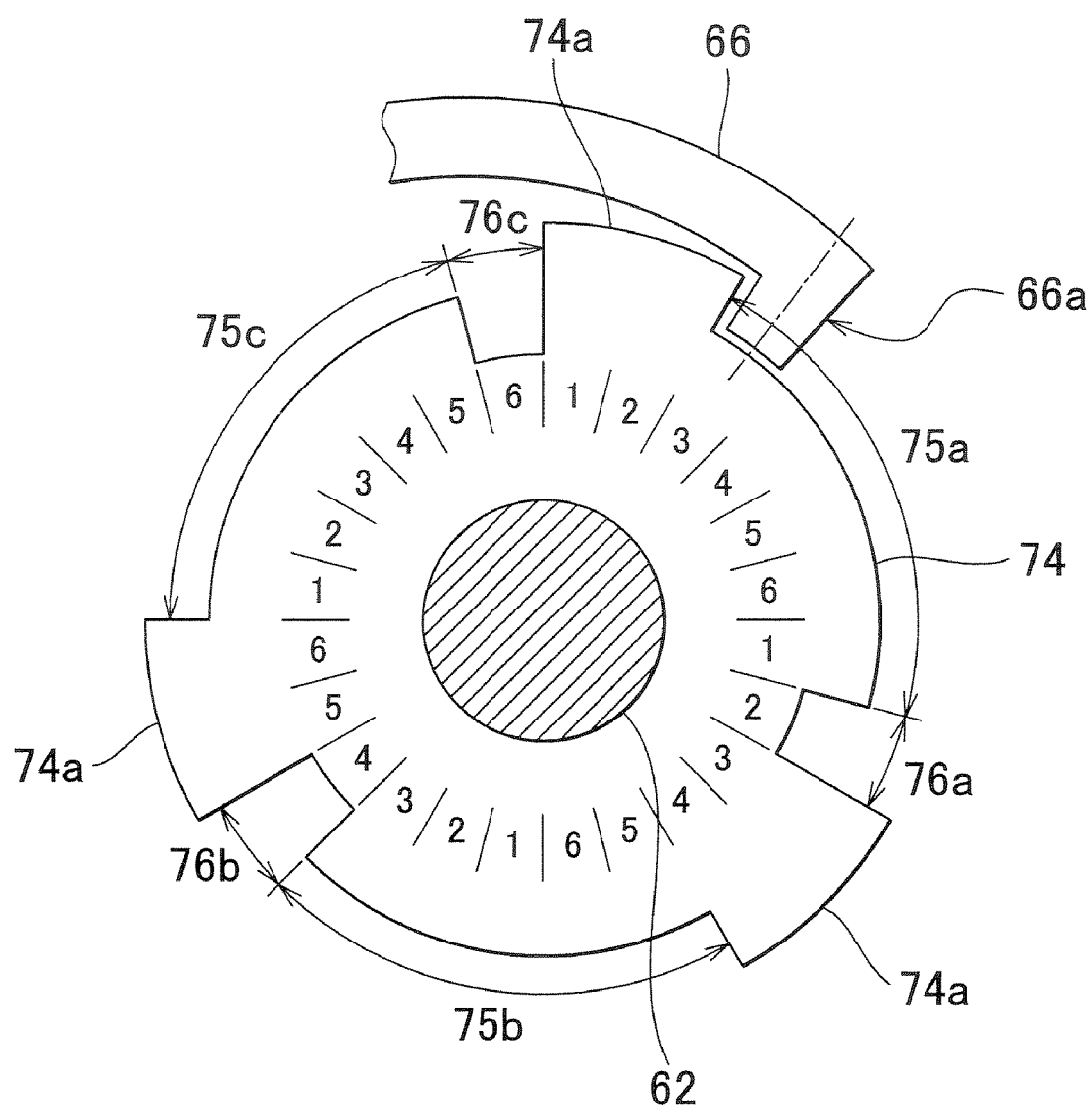
FIG. 6 is a view showing one example of an engaging portion engaged with a shallow groove portion of a lock holder according to a second example embodiment of the invention.

FIG. 6 is a view showing one example of the engaging portion 66a engaged with a shallow groove portion of a lock holder according to a second example embodiment. The structure of the steering system 10 according to the second example embodiment is the same as the structure of the steering system 10 according to the first example embodiment except for that a lock holder 74 is provided in place of the lock holder 60. As described above, the numbers one to six noted on the lock holder 74 are numbers over which the center line in the circumferential direction of the engaging portion 66a is positioned, and refer to the number output by the rotation sensor 72. Therefore, for example, the state shown in FIG. 6 is one in which the rotation sensor 72 outputs sensor pattern "3".

Three teeth portions 74a are provided on the outer periphery of the lock holder 74. In the lock holder 74, a first shallow groove portion 75a, a second shallow groove portion 75b, and a third shallow groove portion 75c (hereinafter these will collectively be referred to as "shallow groove portions 75" as necessary) are formed recessed from the outer periphery of the lock holder 74 between adjacent teeth portions 74a.

When the engaging portion 66a is engaged with the first shallow groove portion 75a, the rotation sensor 72 outputs one sensor pattern from among sensor patterns 3, 4, 5, 6, and 1. When the engaging portion 66a is engaged with the second shallow groove portion 75b, the rotation sensor 72 outputs one sensor pattern from among sensor patterns 5, 6, 1, 2, and 3. When the engaging portion 66a is engaged with the third shallow groove portion 75c, the rotation sensor 72 outputs one sensor pattern from among sensor patterns 1 to 5.

A first deep groove portion 76a, a second deep groove portion 76b, and a third deep groove portion 76c (hereinafter these will collectively be referred to as "deep groove portions 76" as necessary) which are deeper than the shallow groove portions 75 and recessed from the outer periphery are formed adjacent to and on the clockwise direction side of each of the shallow groove portions 75. When the engaging portion 66a is engaged with the first deep groove portion 76a, sensor pattern "2" is output. Similarly, when the engaging portion 66a is engaged with the second deep groove portion 76b, sensor pattern "4" is output, and when the engaging pattern 66a is engaged with the third deep groove portion 76c, sensor pattern "6" is output.

The variable transfer ratio unit ECU 100 determines whether the ignition switch has been operated by the user using the detection signal input from the ignition sensor 30. When the variable transfer ratio unit ECU 100 determines that the ignition switch has been turned off, it stops operation of the solenoid 64 and engages the engaging portion 66a with one of the shallow groove portions 75. Then the variable transfer ratio unit ECU 100 rotates the lock holder 74 in the direction in which the engaging portion 66a moves from the shallow groove portion 75 toward the adjacent deep groove portion 76 (i.e., counterclockwise in the drawing) by supplying current to the motor 24 via the drive circuit and operating the motor 24.

Figure 7:
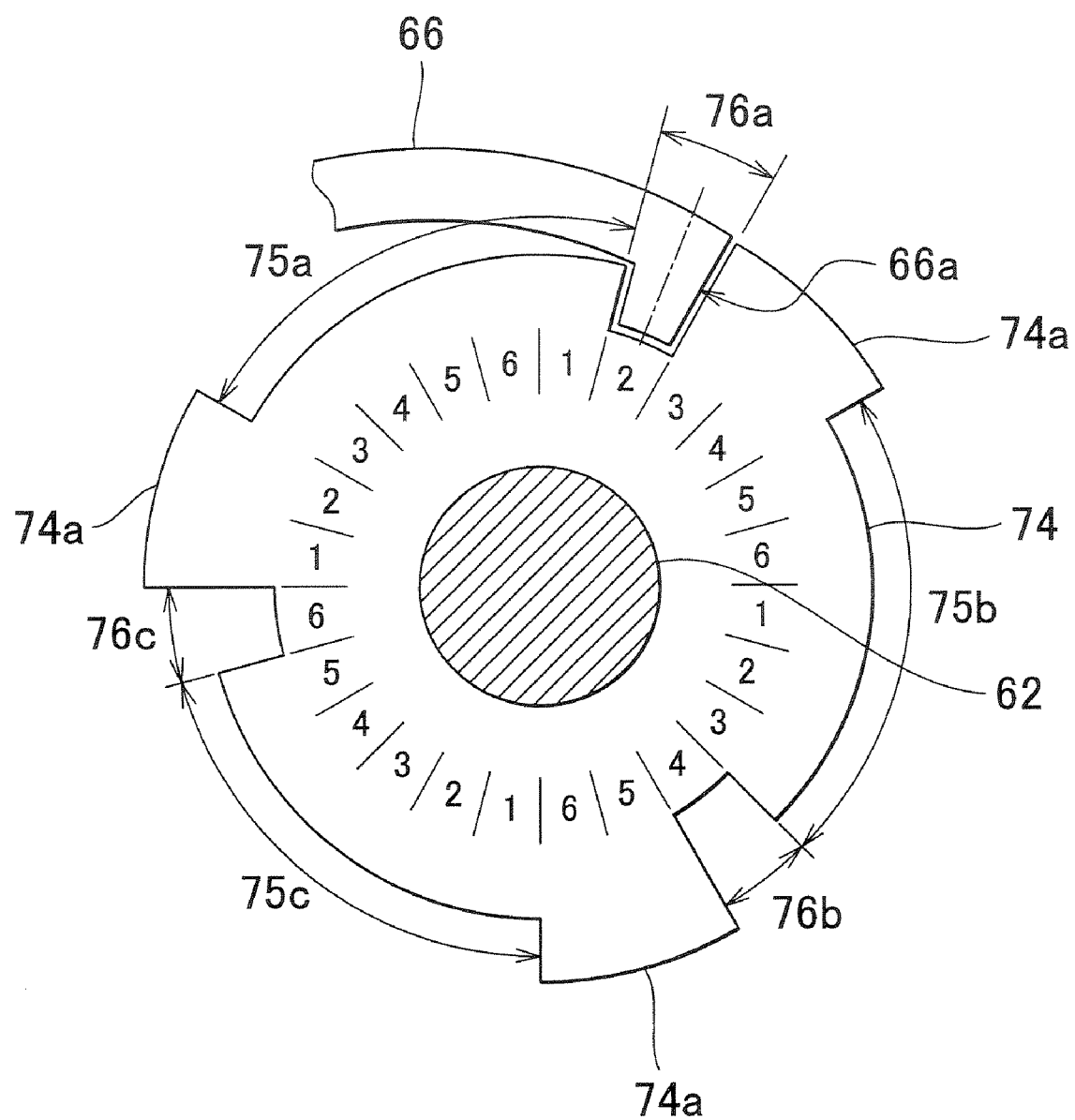
FIG. 7 is a view showing one example of an engaging portion engaged with a deep groove portion of the lock holder according to the second example embodiment.

The deep groove portions 76 are formed near the right side portions of the shallow groove portions 75, and the engaging portion 66a is pushed radially inward by the solenoid 64. Therefore, even when the engaging portion 66a is not engaged with the deep groove portion 76, it engages with the deep groove portion 76 as shown in FIG. 7 when the lock holder 60 is rotated counterclockwise. When it is determined that the ignition switch is on, the variable transfer ratio unit ECU 100 reads the sensor pattern output from the rotation sensor 72 when the engaging portion 66a is engaged with the deep groove portion 76.

All three deep groove portions 76 are the same length in the circumferential direction and formed in the outer periphery of the lock holder 74 at equidistant intervals. Also, as described above, the rotation sensor 72 repeatedly outputs the same detection signal a plurality of times during one rotation of the lock holder 74. When the number of deep groove portions formed in the lock holder 74 is designated N1 and the number of times the rotation sensor 72 outputs the same detection signal during one rotation of the lock holder 74 is designated N2, N1 and N2 are set so that N1 is a smaller value than N2 and is neither a prime factor of N2 nor a multiple of a prime factor of N2. In this second example embodiment, N1 equals 3 and N2 equals 4 so these conditions are satisfied. Setting N1 and N2 in this way makes the detection signals output by the rotation sensor 72 different for each groove portion when the engaging portion 66a is engaged with the deep groove portions 76. Therefore, the variable transfer ratio unit ECU 100 is able to easily detect the deep groove portion 76 that the engaging portion 66a is engaged with by the sensor pattern obtained from the rotation sensor 72.

In this second example embodiment, when the engaging portion 66a is engaged with the first deep groove portion 76a, the rotation sensor 72 outputs sensor pattern "2". When the engaging portion 66a is engaged with the second deep groove portion 76b, the rotation sensor 72 outputs sensor pattern "4". When the engaging portion 66a is engaged with the third deep groove portion 76c, the rotation sensor 72 outputs sensor pattern "6".

After the engaging portion 66a engages with one of the deep groove portions 76, the variable transfer ratio unit ECU 100 rotates the lock holder 74 counterclockwise, which presses one side portion of the deep groove portion 76 against one side portion of the engaging portion 66a. When the sensor pattern input from the rotation sensor 72 does not change even if the motor 24 is driven, the variable transfer ratio unit ECU 100 determines that the engaging portion 66a is engaged with one of the deep groove portions 76.

The variable transfer ratio unit ECU 100 obtains from the rotation sensor 72 the sensor pattern output when one side portion of a deep groove portion 76 is pressed against one side portion of the engaging portion 66a. Using the obtained sensor pattern, the variable transfer ratio unit ECU 100 then detects the deep groove portion 76 that the engaging portion 66a is engaged with. More specifically, if the sensor pattern input from the rotation sensor 72 is 2, the variable transfer ratio unit ECU 100 determines that the engaging portion 66a is engaged with the first deep groove portion 76a. If the sensor pattern input from the rotation sensor 72 is 4, the variable transfer ratio unit ECU 100 determines that the engaging portion 66a is engaged with the second deep groove portion 76b. If the sensor pattern input from the rotation sensor 72 is 6, the variable transfer ratio unit ECU 100 determines that the engaging portion 66a is engaged with the third deep groove portion 76c.

Here, the side portion of each shallow groove portion 75 is formed in a position such that the rotation sensor 72 outputs a different detection signal depending on the rotational position of the lock holder 74 within a rotatable range of the lock holder 74 while the engaging portion 66a is engaged, just as in the first example embodiment. Therefore, the variable transfer ratio unit ECU 100 is not only able to detect which deep groove portion 76 the engaging portion 66a is engaged with, but can also correctly ascertain the relative positions in the rotational direction of the input shaft 14 and the output shaft 16 using the sensor pattern input from the rotation sensor 72.

Once the relative positions in the rotational direction of the input shaft 14 and the output shaft 16 are determined, the variable transfer ratio unit ECU 100 supplies power to the solenoid 64 to disengage the engaging portion 66a from the deep groove portion 76, thus enabling the transfer ratio to be changed by the variable transfer ratio unit 20.

Third Example Embodiment

Figure 8:
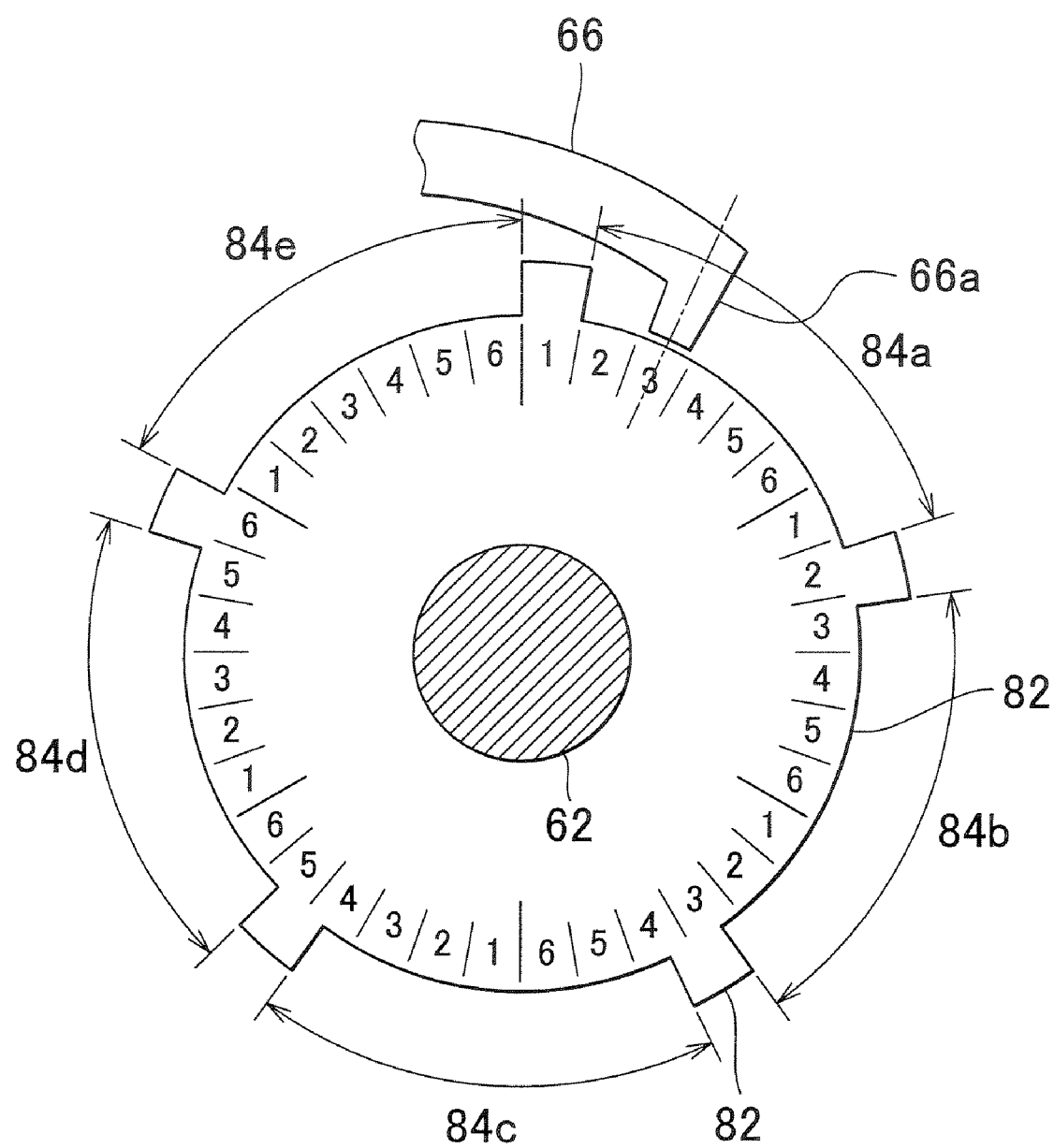
FIG. 8 is a view illustrating the relationship between the position in the rotational direction of a lock holder according to a third example embodiment of the invention and the sensor pattern output from the rotation sensor.

FIG. 8 is a view illustrating the relationship between the position in the rotational direction of a lock holder 82 according to a third example embodiment and the sensor pattern output from the rotation sensor 72. The structure of the steering system 10 according to the third example embodiment is the same as the structure of the steering system 10 according to the first example embodiment except for that the lock holder 82 is provided in place of the lock holder 60. As described above, the numbers one to six noted on the lock holder 82 are numbers over which the center line in the circumferential direction of the engaging portion 66a is positioned, and refer to the number output by the rotation sensor 72. Therefore, for example, the state shown in FIG. 8 is one in which the rotation sensor 72 outputs sensor pattern "3".

Groove portions 84 having the same length in the circumferential direction are formed in the outer periphery of the lock holder 82 at equidistant intervals. Also, as described above, the rotation sensor 72 repeatedly outputs the same detection signal a plurality of times during one rotation of the lock holder 82. When the number of groove portions formed in the lock holder 82 is designated N1 and the number of times the rotation sensor 72 outputs the same detection signal during one rotation of the lock holder 82 is designated N2, N1 and N2 are set so that N1 is a smaller value than N2 and is neither a prime factor of N2 nor a multiple of a prime factor of N2. In this third example embodiment, N1 equals 5 and N2 equals 6 so these conditions are satisfied. Setting N1 and N2 in this way results in the rotation sensor 72 outputting a different detection signal when one end portion of one groove portion 84 is pressed against the side portion of the engaging portion 66a than it does when one end portion of another groove portion 84 is pressed against the side portion of the engaging portion 66a.

In this third example embodiment, when the engaging portion 66a is engaged with the first groove portion 84a, the right side portion of the first groove portion 84a presses against the right side portion of the engaging portion 66a so the rotation sensor 72 outputs sensor pattern 1. When the engaging portion 66a is engaged with the second groove portion 84b, the rotation sensor 72 outputs sensor pattern "2" by the right side portion of the second groove portion 84b pressing against the right side portion of the engaging portion 66a. When the engaging portion 66a is engaged with the third groove portion 84c, the rotation sensor 72 outputs sensor pattern "4" by the right side portion of the third groove portion 84c pressing against the right side portion of the engaging portion 66a. When the engaging portion 66a is engaged with the fourth groove portion 84d, the rotation sensor 72 outputs sensor pattern "5" by the right side portion of the fourth groove portion 84d pressing against the right side portion of the engaging portion 66a. When the engaging portion 66a is engaged with the fifth groove portion 84e, the rotation sensor 72 outputs sensor pattern "6" by the right side portion of the fifth groove portion 84e pressing against the right side portion of the engaging portion 66a.

After the variable transfer ratio unit ECU 100 has engaged the engaging portion 66a with one of the groove portions 84 when the ignition switch is turned off, it then operates the motor 24 to rotate the lock holder 82 counterclockwise in the drawing, just like in the first example embodiment. Then when the ignition switch is turned on, the variable transfer ratio unit ECU 100 identifies the rotational position of the motor 24 using the rotation count number of the motor 24 stored in the EEPROM and the sensor pattern output from the rotation sensor 72, also just like in the first example embodiment.

When it is determined that the ignition switch has been turned on, the variable transfer ratio unit ECU 100 references the sensor pattern output from the rotation sensor 72. If the sensor pattern is "1", the variable transfer ratio unit ECU 100 determines that the engaging portion 66a is engaged with the first groove portion 84a. Similarly, if the sensor pattern is "2", the variable transfer ratio unit ECU 100 determines that the engaging portion 66a is engaged with the second groove portion 84b. If the sensor pattern is "4", the variable transfer ratio unit ECU 100 determines that the engaging portion 66a is engaged with the third groove portion 84c. If the sensor pattern is "5", the variable transfer ratio unit ECU 100 determines that the engaging portion 66a is engaged with the fourth groove portion 84d. If the sensor pattern is "6", the variable transfer ratio unit ECU 100 determines that the engaging portion 66a is engaged with the fifth groove portion 84e.

In this way, in the third example embodiment as well, the rotation sensor 72 outputs a different detection signal when a side portion of one groove portion 84 is pressed against a side portion of the engaging portion 66a than it does when a side portion of another groove portion 84 is pressed against a side portion of the engaging portion 66a. While the ignition switch is on, the variable transfer ratio unit ECU 100 can determined which groove portion the engaging portion 66a is engaged with without pressing the side portion of a groove portion pressing against the side portion of the engaging portion 66a, just as in the first example embodiment.

Fourth Example Embodiment

Figure 9:
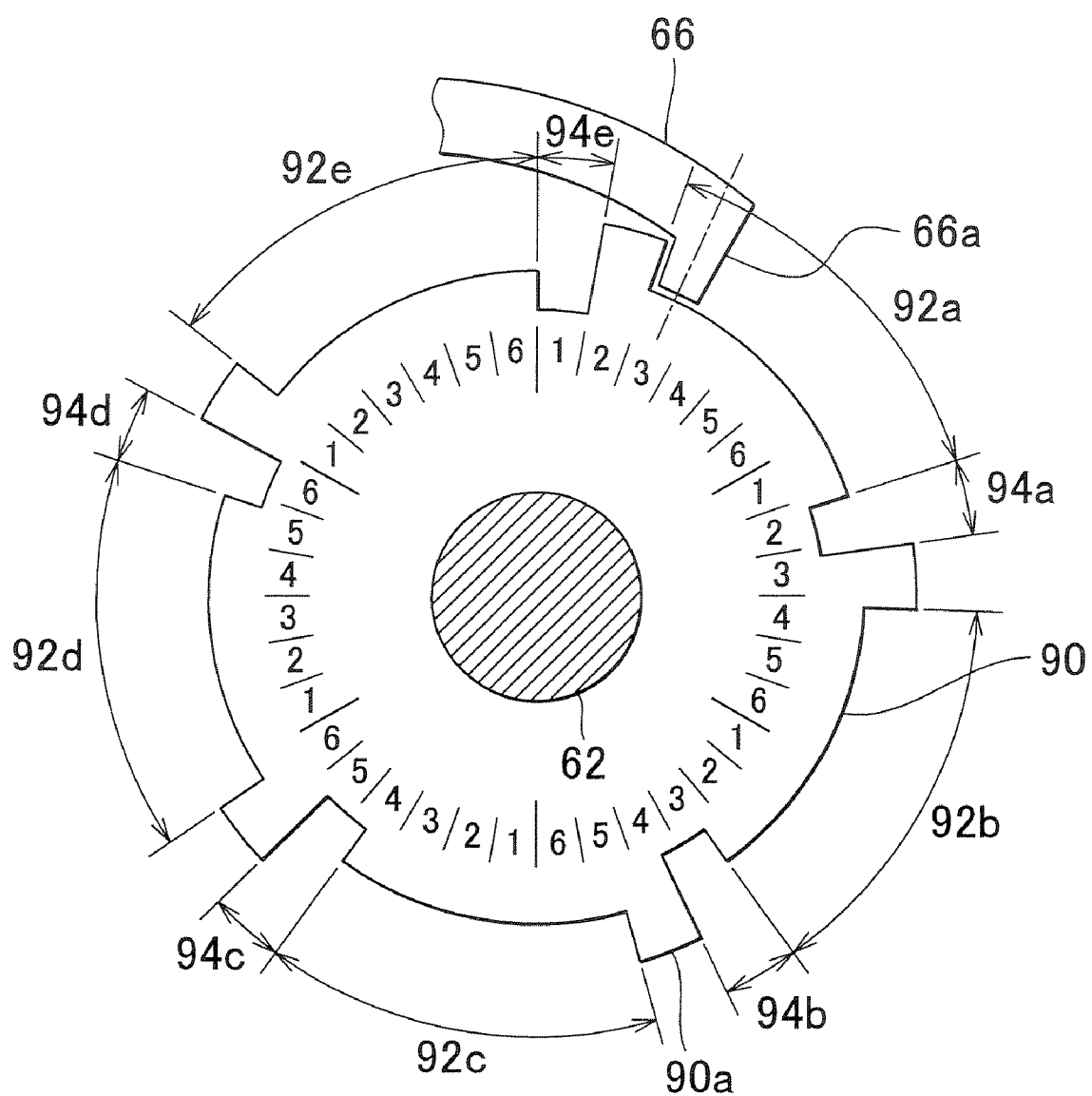
FIG. 9 is a view illustrating the relationship between the position in the rotational direction of a lock holder according to a fourth example embodiment of the invention and the sensor pattern output from the rotation sensor.

FIG. 9 is a view illustrating the relationship between the position in the rotational direction of a lock holder 90 according to a fourth example embodiment and the sensor pattern output from the rotation sensor 72. The structure of the steering system 10 according to the fourth example embodiment is the same as the structure of the steering system 10 according to the first example embodiment except for that the lock holder 90 is provided in place of the lock holder 60. As described above, the numbers one to six noted on the lock holder 90 are numbers over which the center line in the circumferential direction of the engaging portion 66a is positioned, and refer to the number output by the rotation sensor 72. Therefore, the state shown in FIG. 9 is one in which the rotation sensor 72 outputs sensor pattern "3".

Five teeth portions 90a are formed on the outer periphery of the lock holder 90. First through fifth shallow groove portions 92a to 92e (hereinafter these will collectively be referred to as "shallow groove portions 92" as necessary) are formed recessed from the outer periphery of the lock holder 90 between adjacent teeth portions 90a in the lock holder 90.

First through fifth deep groove portions 94a to 94e (hereinafter these will collectively be referred to as "deep groove portions 94") are formed deeper than the shallow groove portions 92, recessed from the outer periphery in positions adjacent to the clockwise direction side of each shallow groove portion 92. All of the groove portions 94 are the same length in the circumferential direction and formed in the outer periphery of the lock holder 90 at equidistant intervals. Also, as described above, the rotation sensor 72 repeatedly outputs the same detection signal a plurality of times during one rotation of the lock holder 90. When the number of deep groove portions formed in the lock holder 90 is designated N1 and the number of times the rotation sensor 72 outputs the same detection signal during one rotation of the lock holder 90 is designated N2, N1 and N2 are set so that N1 is a smaller value than N2 and is neither a prime factor of N2 nor a multiple of a prime factor of N2. In this fourth example embodiment, N1 equals 5 and N2 equals 6 so these conditions are satisfied. Setting N1 and N2 in this way makes the detection signals output by the rotation sensor 72 different for each deep groove portion 94 when the engaging portion 66a is engaged with the deep groove portions 94.

In the fourth embodiment, when the engaging portion 66a is engaged with the first deep groove portion 94a, the rotation sensor 72 outputs sensor pattern "2". When the engaging portion 66a is engaged with the second deep groove portion 94b, the rotation sensor 72 outputs sensor pattern "3". When the engaging portion 66a is engaged with the third deep groove portion 94c, the rotation sensor 72 outputs sensor pattern "5". When the engaging portion 66a is engaged with the fourth deep groove portion 94d, the rotation sensor 72 outputs sensor pattern "6". When the engaging portion 66a is engaged with the fifth deep groove portion 94e, the rotation sensor 72 outputs sensor pattern "1". Therefore, the variable transfer ratio unit ECU 100 can easily detect which deep groove portion 94 the engaging portion 66a is engaged with using the sensor pattern obtained from the rotation sensor 72.

When the ignition switch is turned off, after the engaging portion 66a is engaged with the shallow groove portion 92, the lock holder 90 is rotated in the direction such that the engaging portion 66a moves from the shallow groove portion 92 toward the adjacent deep groove portion 94 (i.e., counterclockwise in the drawing), just as in the second example embodiment. Also, thereafter when the ignition is turned on, the variable transfer ratio unit ECU 100 identifies the rotational position of the motor 24 using the sensor pattern output from the rotation sensor 72 and the rotation count number of the motor 24 stored in the EEPROM, also just like the second example embodiment. Accordingly, the engaging portion 66a can be engaged with the deep groove portion 94 even if it was not when the ignition switch was turned off. When the sensor pattern input from the rotation sensor 72 does not change even if the motor 24 is driven, the variable transfer ratio unit ECU 100 determines that the engaging portion 66a is engaged with one of the deep groove portions 94, just as in the second example embodiment.

The variable transfer ratio unit ECU 100 obtains from the rotation sensor 72 the sensor pattern when a side portion of a deep groove portion 94 is pressed against a side portion of the engaging portion 66a. Using the obtained sensor pattern, the variable transfer ratio unit ECU 100 then detects the deep groove portion 94 that the engaging portion 66a is engaged with. More specifically, if the sensor pattern input from the rotation sensor 72 is 2, the variable transfer ratio unit ECU 100 determines that the engaging portion 66a is engaged with the first deep groove portion 94a. Similarly, if the sensor pattern input from the rotation sensor 72 is 3, the variable transfer ratio unit ECU 100 determines that the engaging portion 66a is engaged with the second deep groove portion 94b. If the sensor pattern input from the rotation sensor 72 is 5, the variable transfer ratio unit ECU 100 determines that the engaging portion 66a is engaged with the third deep groove portion 94c. If the sensor pattern input from the rotation sensor 72 is 6, the variable transfer ratio unit ECU 100 determines that the engaging portion 66a is engaged with the fourth deep groove portion 94d. If the sensor pattern input from the rotation sensor 72 is 1, the variable transfer ratio unit ECU 100 determines that the engaging portion 66a is engaged with the fifth deep groove portion 94e.

In this way, the lock holder 90 is formed such that a different sensor pattern is output from the rotation sensor 72 for each deep groove portion 94 that the engaging portion 66a is engaged with. Therefore, the variable transfer ratio unit ECU 100 can easily detect which deep groove portion 94 the engaging portion 66a is engaged with using the sensor pattern obtained from the rotation sensor 72.

The invention is not limited to the foregoing example embodiments. To the contrary, example embodiments of the invention in which individual elements of the foregoing example embodiments are appropriately combined are also effective. Also, various modifications such as design changes or the like may also be made to the foregoing example embodiments based on know-how of those skilled in the art.

Example embodiments to which such modifications have been made are also included in the scope of the invention. Some examples are as follows.

As in the first and third example embodiments, same-depth groove portions may be formed having the same length in the circumferential direction in the outer periphery of the lock holder at equidistant intervals. Also, when the rotation sensor repeatedly outputs the same detection signal a plurality of times during one rotation of the lock holder, the number N1 of groove portions formed in the lock holder and the number N2 of times the rotation sensor outputs the same detection signal during one rotation of the lock holder may be a combination other than the combination of the first example embodiment, i.e., N1=3 and N2=4 or the combination of the third example embodiment, i.e., N1=5 and N2=6. In this case, N1 and N2 are set so that N1 is a smaller value than N2 and is neither a prime factor of N2 nor a multiple of a prime factor of N2.

FIG. 10 shows this kind of N1 and N2 combination. Setting N1 and N2 in this way enables a different detection signal to be output by the rotation sensor when a side portion of one of the groove portions is pressed against a side portion of the engaging portion than when a side portion of another groove portion is pressed against a side portion of the engaging portion. As a result, it is possible to easily detect which groove portion the engaging portion is engaged with by pressing a side portion of the groove portion against a side portion of the engaging portion.

As in the second and fourth example embodiments, deep groove portions may be formed having the same length in the circumferential direction in the outer periphery of the lock holder at equidistant intervals. Also, when the rotation sensor repeatedly outputs the same detection signal a plurality of times during one rotation of the lock holder, the number N1 of deep groove portions and the number N2 of times the rotation sensor outputs the same detection signal during one rotation of the lock holder may be a combination other than the combination of the second example embodiment, i.e., N1=3 and N2=4 or the combination of the fourth example embodiment, i.e., N1=5 and N2=6. In this case, N1 and N2 are set so that N1 is a smaller value than N2 and is neither a prime factor of N2 nor a multiple of a prime factor of N2.

FIG. 10 can also be applied to this kind of N1 and N2 combination. Setting N1 and N2 in this way enables a different detection signal to be output from the rotation sensor when the engaging portion is engaged with one deep groove portion than is output when the engaging portion is engaged with another deep groove portion. Accordingly, it is possible to easily detect which deep groove portion the engaging portion is engaged with by engaging the engaging portion with a deep groove portion.

The difference generating mechanism 26 may also include a planetary gear set, or the like instead of the wave generator, the flexspline, the driven gear, and the stator gear. This kind of a planetary gear set also enables a difference of the steering amount in the rotational direction to be generated between the input shaft 14 and the output shaft 16.

In the first or third example embodiment, the variable transfer ratio unit ECU 100 may also supply current to the motor 24 via the drive circuit and operate the motor 24 to rotate the lock holder clockwise in FIG. 5 or FIG. 8 after the engaging portion 66a is engaged with a groove portion. For example, the steering system 10 having the lock holder 60 of the first example embodiment will be described as an example. When the lock holder 60 stops rotating, i.e., when the left side portion of a groove portion of the lock holder 60 is pressing against the left side portion of the engaging portion 66a, the variable transfer ratio unit ECU 100 references the sensor pattern output from the rotation sensor 72. When the sensor pattern is "2", the variable transfer ratio unit ECU 100 determines that the engaging portion 66a is engaged with the first groove portion 65a. When the sensor pattern is "4", the variable transfer ratio unit ECU 100 determines that the engaging portion 66a is engaged with the second groove portion 65b. When the sensor pattern is "6", the variable transfer ratio unit ECU 100 determines that the engaging portion 66a is engaged with the third groove portion 65c. In this way, it is possible to detect which groove portion, from among the plurality of groove portions formed in the outer periphery of the lock holder 60, the engaging member is engaged with even if the lock holder 60 is rotated clockwise in FIG. 5 when the ignition is turned on.

In the second or fourth example embodiment, the lock holder may also be formed such that when the engaging portion 66a is engaged with a deep groove portion, any one of a plurality of sensor patterns is output. In this case as well, the lock holder is formed such that a different sensor pattern is output by the rotation sensor 72 when the engaging portion 66a is engaged with one deep groove portion than is output when the engaging portion 66a is engaged with another deep groove portion.

For example, the steering system 10 having the lock holder 74 according to the second example embodiment will be described as an example. In this modified example, the first deep groove portion 76a is formed such that sensor pattern "1" or "2" is output when the engaging portion 66a is engaged with the first deep groove portion 76a. Also, the second deep groove portion 76b is formed such that sensor pattern "3" or "4" is output when the engaging portion 66a is engaged with the second deep groove portion 76b. Further, the third deep groove portion 76c is formed such that sensor pattern "5" or "6" is output when the engaging portion 66a is engaged with the third deep groove portion 76c. Accordingly, the width of the deep groove portions 76 can be widened so that the engaging portion 66a that was engaged with a shallow portion 75 can be made to engage with a deep portion 76 by rotating the lock holder 74 with a small rotation angle. Therefore, the affect on the feel of a steering wheel operation by the user can be minimized.

What is claimed is:

1. A steering apparatus, comprising:
    a difference generating mechanism that generates a difference of a steering amount in a rotational direction between an input shaft connected to a steering wheel and an output shaft connected to a steering unit that steers a wheel;
    a differential lock mechanism including a lock holder in which a plurality of groove portions are formed in an outer periphery thereof, the differential lock mechanism selectively allowing and prohibiting a generation of a difference of the steering amount between the input shaft and the output shaft by selectively engaging and disengaging an engaging member with respect to the groove portions;
    a rotation sensor that outputs a detection signal indicative of a position in the rotational direction of the lock holder; and
    a lock position detecting portion that detects which groove portion, from among the plurality of groove portions, the engaging member is engaged with based on the detection signal output from the rotation sensor when a side portion of one of the groove portions presses against a side portion of the engaging member.

2. The steering apparatus according to claim 1, wherein the plurality of groove portions are formed such that the detection signal output by the rotation sensor when the side portion of one groove portion presses against the side portion of the engaging member is different from the detection signal output by the rotation sensor when the side portion of another groove portion presses against the side portion of the engaging member.

3. The steering apparatus according to claim 1, wherein the plurality of groove portions have a same length as each other in a circumferential direction of the lock holder and are formed in an outer periphery of the lock holder at equidistant intervals, the rotation sensor outputs a same detection signal a plurality of times during one rotation of the lock holder, and when a number of the groove portions formed in the lock holder is designated N1 and a number of times the rotation sensor outputs the same detection signal during one rotation of the lock holder is designated N2, N1 and N2 are set such that N1 is smaller than N2 and is neither a prime factor of N2 nor a multiple of a prime factor of N2.

4. The steering apparatus according to claim 1, wherein the rotation sensor outputs a different detection signal depending on the rotational position of the lock holder within a rotatable range of the lock holder while the engaging member is engaged with one of the groove portions from among the plurality of groove portions.

5. The steering apparatus according to claim 2, wherein the rotation sensor outputs a different detection signal depending on the rotational position of the lock holder within a rotatable range of the lock holder while the engaging member is engaged with one of the groove portions from among the plurality of groove portions.

6. The steering apparatus according to claim 3, wherein the rotation sensor outputs a different detection signal depending on the rotational position of the lock holder within a rotatable range of the lock holder while the engaging member is engaged with one of the groove portions from among the plurality of groove portions.

* * * * *